United States Patent
Krueger et al.

(10) Patent No.: US 9,893,602 B2
(45) Date of Patent: Feb. 13, 2018

(54) SWITCHED-MODE POWER CONVERTER WITH SAMPLED FEEDBACK SIGNAL

(71) Applicant: Infineon Technologies Austria AG, Villach (AT)

(72) Inventors: Martin Krueger, Oberschleissheim (DE); Marc Fahlenkamp, Geretsried (DE); Torsten Hinz, Augsburg (DE)

(73) Assignee: Infineon Technologies Austria AG, Villach (AT)

( * ) Notice: Subject to any disclaimer, the term of this patent is extended or adjusted under 35 U.S.C. 154(b) by 27 days.

(21) Appl. No.: 14/612,652

(22) Filed: Feb. 3, 2015

(65) Prior Publication Data
US 2015/0244246 A1 Aug. 27, 2015

Related U.S. Application Data (60) Provisional application No. 61/944,821, filed on Feb. 26, 2014.

(51) Int. Cl.
*H02M 1/00* (2006.01)
*H02M 3/335* (2006.01)

(52) U.S. Cl.
CPC ......... *H02M 1/00* (2013.01); *H02M 3/33507* (2013.01); *H02M 2001/0025* (2013.01)

(58) Field of Classification Search
CPC ............... H02M 1/00; H02M 3/33507; H02M 2001/0025
See application file for complete search history.

(56) References Cited

U.S. PATENT DOCUMENTS

| | | | |
|---|---|---|---|
| 4,942,509 A * | 7/1990 | Shires | H02M 1/4225 323/222 |
| 8,810,228 B2 | 8/2014 | Kim et al. | |
| 9,225,441 B2 | 12/2015 | Strachan et al. | |
| 9,331,567 B2 | 5/2016 | Lin et al. | |
| 2013/0038306 A1 | 2/2013 | Kelly et al. | |
| 2013/0100715 A1* | 4/2013 | Lin | H02M 3/33507 363/21.17 |
| 2013/0278059 A1 | 10/2013 | Liu et al. | |
| 2013/0308350 A1 | 11/2013 | Huang et al. | |
| 2014/0146866 A1* | 5/2014 | Strachan | G01R 31/086 375/226 |

FOREIGN PATENT DOCUMENTS

| | | |
|---|---|---|
| CN | 103078489 A | 5/2013 |
| CN | 103166472 A | 6/2013 |
| CN | 103547933 A | 1/2014 |

\* cited by examiner

*Primary Examiner* — Jue Zhang
*Assistant Examiner* — Lakaisha Jackson
(74) *Attorney, Agent, or Firm* — Slater Matsil, LLP (57) ABSTRACT

In accordance with an embodiment, a method of operating a switched-mode power converter includes driving a switching element in successive drive cycles, in which the switching element is driven to switch on for an on-period and subsequently driven to switch off for an off-period; sampling a feedback signal two or more times during the drive cycles, where the feedback signal includes a signal representative of an operation parameter of the switched-mode power converter and noise. The method further includes filtering the sampled feedback signal to extract the signal representative of the operation parameter from the sampled feedback signal and controlling the switching element according to the filtered feedback signal.

21 Claims, 5 Drawing Sheets

SWITCHED-MODE POWER CONVERTER WITH SAMPLED FEEDBACK SIGNAL

This application claims the benefit of U.S. Provisional Application No. 61/944,821, filed on Feb. 26, 2014, which application is hereby incorporated herein by reference in its entirety.

TECHNICAL FIELD

The disclosure relates to a switched-mode power converter, a method configured to operate a switched-mode power converter, and a computer-readable storage device storing computer-executable instructions that, in response to execution, cause a processing component to perform operations.

BACKGROUND

Each time a switch, such as a transistor, is turned on or off in switched-mode power converter, energy is dissipated in proportion to the current and voltage being switched. The power losses associated with switch operation, referred to as switching losses, represent a significant source of power dissipation and therefore a significant source of inefficiency within conventional switch mode power converters. In addition to increasing switching loss, large rates of change for voltages and/or currents (i.e., dv/dt and/or di/dt) at the time of switch transition increase stress upon the switch and the amount of electromagnetic interference (EMI) produced by the switch. Some switching schemes have been developed that take advantage of resonance within switch-mode power converters to turn on switches at times when the voltages applied to the switches are at a local minimum, referred to as a valley. Other switching schemes use a constant switching frequency or a frequency of certain bursts.

SUMMARY

A method configured to operate a switched-mode power converter, in which the power converter is operable to convert an input voltage into an output voltage at a variable switching frequency of a switching element in the power converter comprises: a method of operating a switched-mode power converter, in which the power converter is operable to convert an input voltage into an output voltage at a switching frequency of a switching element in the power converter; the method comprising driving the switching element in successive drive cycles, in which the switching element is driven to switch on for an on-period and subsequently driven to switch off for an off-period; sampling a feedback signal two or more times during the drive cycles; the feedback signal comprising a signal representative of an operation parameter of the switched-mode power converter and noise; filtering the sampled feedback signal to extract the signal representative of the operation parameter from the sampled feedback signal; and controlling the switching element according to the filtered feedback signal.

A switched-mode power converter, which is operable to convert an input voltage into an output voltage, comprises a control unit configured to drive the switching element in successive drive cycles, in which the switching element is driven to switch on for an on-period and subsequently driven to switch off for an off-period; wherein the control unit is further configured to sample a feedback signal two or more times during the drive cycles; the feedback signal comprising a signal representative of an operation parameter of the switched-mode power converter and noise; filter the sampled feedback signal to extract the signal representative of the operation parameter from the sampled feedback signal; and control the switching element according to the filtered feedback signal.

A computer-readable storage device stores computer-executable instructions that, in response to execution, cause a processing component to drive a switching element of a switched-mode power converter in successive drive cycles, in which the switching element is driven to switch on for an on-period and subsequently driven to switch off for an off-period; sample a feedback signal two or more times during the drive cycles; the feedback signal comprising a signal representative of an operation parameter of the switched-mode power converter and noise; filter the sampled feedback signal to extract the signal representative of the operation parameter from the sampled feedback signal; and control the switching element according to the filtered feedback signal.

Other converters, methods, software, features and advantages will be, or will become, apparent to one with skill in the art upon examination of the following figures and detailed description. It is intended that all such additional converters, methods, programs, features and advantages be included within this description, be within the scope of the invention, and be protected by the following claims.

BRIEF DESCRIPTION OF THE DRAWINGS

The system may be better understood with reference to the following drawings and description. In the figures, like referenced numerals designate corresponding parts throughout the different views.

DETAILED DESCRIPTION OF ILLUSTRATIVE EMBODIMENTS

Figure 1:
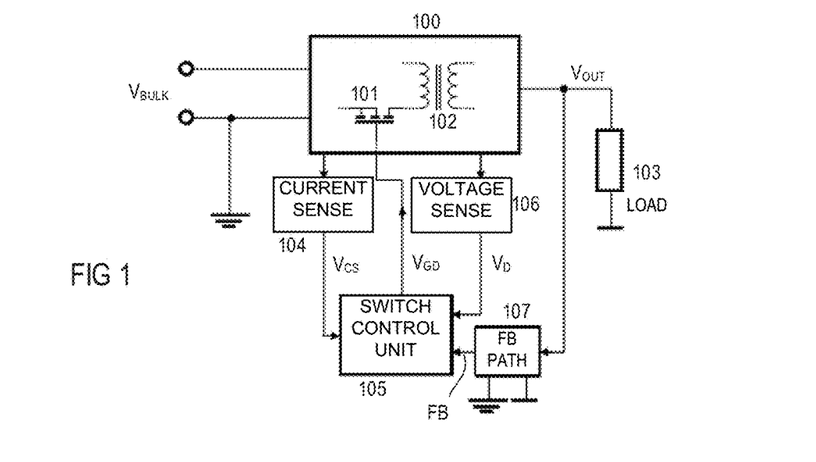
FIG. 1 is circuit diagram illustrating a first exemplary switched-mode power converter.

Referring to FIG. 1, an exemplary switched-mode power converter may include a power conversion unit 100, e.g., a DC-DC flyback converter with a switching element 101, a magnetic element such as a transformer 102, and other parts (not shown) such as rectifiers, capacitors etc. The power conversion unit 100 has an input which is supplied with a DC voltage, bulk voltage $V_{BULK}$, and an output which supplies an output voltage $V_{OUT}$ to a load 103. Switching element 101 may be a semiconductor switch, such as metal oxide semiconductor field-effect transistor (MOSFET), an insulated gate bipolar transistor (IGBT) or the like, which is configured to connect the transformer to voltage $V_{BULK}$ in accordance with a respective control signal. The switched-mode power converter may further include a current sense module 104 that provides a current sense signal, e.g., a (primary) current sense voltage $V_{CS}$ representing the current flowing through a primary winding of transformer 102. A switch control unit 105 is configured to generate a control signal $V_{GD}$ supplied to the switching element 103 for switching the switching element 101 on (conducting) and off (non-conducting) according to the control signal $V_{GD}$. If the switching element 101 is a MOSFET or an IGBT, the control signal $V_{GD}$ may be applied to the gate thereof.

Switch control unit 105 is configured to control the switching operation of the power conversion unit 100. In the following examples, the switch control unit 105 is configured to control the power conversion unit 100 to operate in at least one of a multiplicity of operation modes such as a quasi-resonant mode, i.e. self-oscillating mode. The control unit 10 may further be configured to compare the current sense voltage $V_{CS}$ with a reference voltage. The control signal $V_{GD}$ is set to switch off a primary current flowing into transformer 102 when the current sense signal $V_{CS}$ equals or exceeds the reference voltage. In quasi-resonant mode, switching element 101 may be switched on when the voltage across the switching element 101 is at a (local) minimum, also known as voltage valley or valley. To achieve this, the switched-mode power converter may comprise a voltage sense module 106 for directly or indirectly monitoring the voltage drop $V_D$ across the switching element 101 during the off-time of switching element 101 in order to allow for detecting the time instant when the voltage is at the minimum (valley). A feedback path 107 from the switched-mode power converter output (i.e., from the output of a power conversion unit 100) to switch control unit 105 may provide an additional input signal, a feedback signal FB, to the switch control unit 105. The feedback path 107 may include basic signal processing (e.g., PI or PID regulation) and galvanic isolation (e.g., by way of opto-electronic couplers etc.).

Switching at the valleys minimizes switching losses and electromagnetic emissions (EMI). Commonly, a fixed valley of a number of valleys in a row, e.g., the first, second or any other valley, is used as a trigger for controlling the switching element 101 to switch on. The switching frequency of the switched-mode power converter, when in quasi-resonant mode, corresponds to the load 103 and, thus, may widely vary. Other modes of operation may be, for example, continuous current mode, discontinuous current mode and burst mode.

Figure 2:
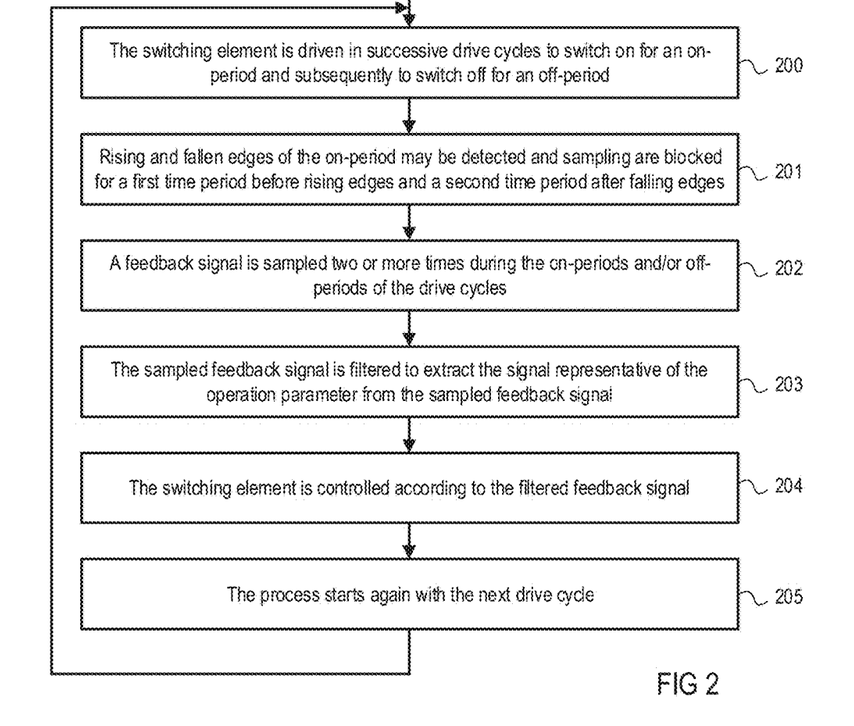
FIG. 2 is a flow chart illustrating an exemplary method of operating a switched-mode power converter.

Referring to FIG. 2, an exemplary method of operating a switched-mode power converter may include the following procedures, which may be implemented in hardware, software or any combination thereof. The switching element is driven in successive drive cycles, in which the switching element is driven to switch on for an on-period and subsequently driven to switch off for an off-period (200). Rising and fallen edges of the on-period may be detected and sampling may be blocked for a first time period (see time period TR in FIG. 7) before rising edges and a second time period after falling edges (see time period TF in FIG. 7) (201). A feedback signal is sampled two or more times during the on-periods or off-periods (or both, on-periods and off-periods) of the drive cycles (202), wherein the feedback signal comprises a signal representative of an operation parameter of the switched-mode power converter and noise. Then the sampled feedback signal is filtered to extract the signal representative of the operation parameter from the sampled feedback signal (203). The switching element is controlled according to the filtered feedback signal (204). The process starts again with the next drive cycle (205).

Figure 3:
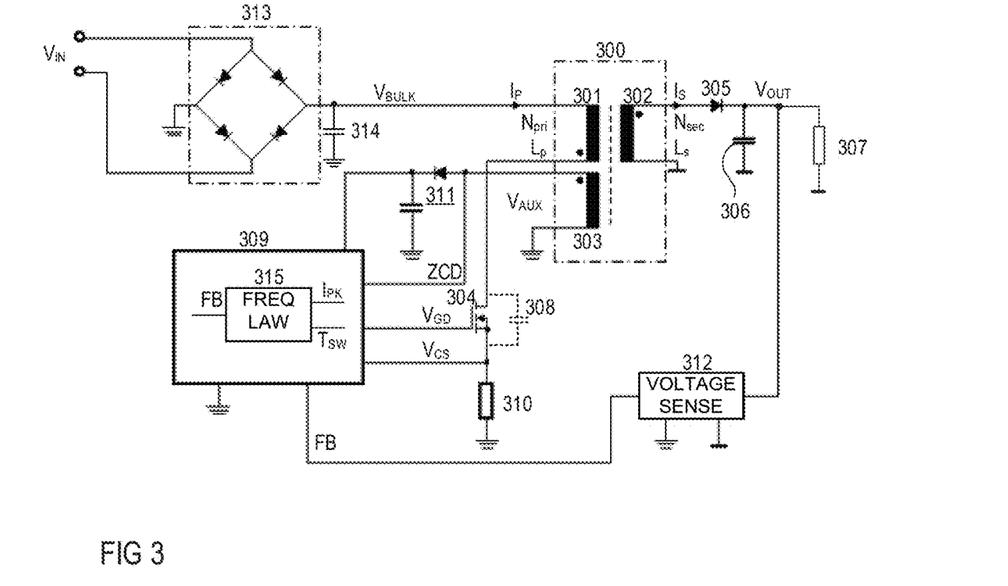
FIG. 3 is a circuit diagram illustrating a second exemplary switched-mode power converter.
Figure 4:
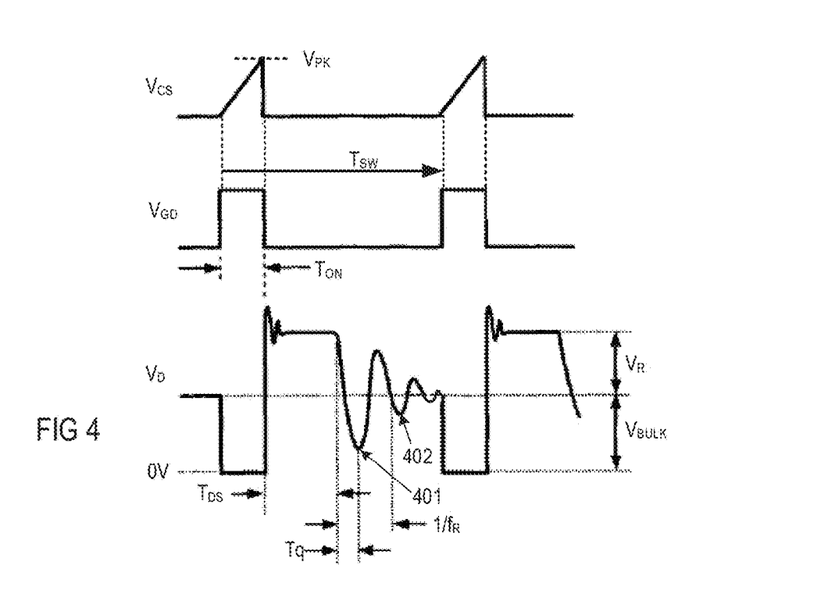
FIG. 4 is a diagram illustrating input and output signals of a switch control unit in the exemplary switched-mode power converter shown in FIG. 3.

FIG. 3 depicts another exemplary switched-mode power converter (e.g., a pulse width modulated flyback converter) in which a switching device 304 is operable to connect a transformer 300 to a DC input voltage, bulk voltage $V_{BULK}$, and to control the power delivered from a primary winding 301 to the secondary winding 302 of transformer 300. Energy is stored into the transformer 300 when the switching device 304 is turned on. As the switching device 304 is switched off, the energy of the transformer 300 is discharged to a capacitor 306 and to a load 307 at the output of the power converter through a rectifier 305 so that an output voltage $V_{OUT}$ appears at the load 307. As shown in FIG. 4, a reflected voltage $V_R$ is generated at this time in the primary winding 301 of transformer 300 in accordance with the output voltage $V_{OUT}$ and the turn-ratio of the transformer 300. Therefore, a voltage $V_D$ across the switching device 304 is equal to the bulk voltage $V_{BULK}$ plus the reflected voltage $V_R$ once the switching device 304 is turned off. The energy corresponding to the voltage $V_D$ is stored in a parasitic capacitor 308 of the switching device 304. After a discharge period $T_{DS}$, the energy of the transformer 300 is fully discharged and the energy stored in the parasitic capacitor 308 flows back to the bulk voltage $V_{BULK}$ through the primary winding 301 of the transformer 300. Capacitance $C_j$, which represents all applicable parasitic capacitance like drain-source capacitance 308 of switching device 304 or winding capacitance of transformer 300, and the inductance $L_P$ of the primary winding 301 develop a resonant tank, whose resonant frequency $f_R$ can be described as equation (1a):

$$f_R = \frac{1}{2\pi\sqrt{L_P \cdot C_j}}. \tag{1a}$$

During the resonant period, the energy of the parasitic capacitor 308 is delivered to the inductance provided by primary winding 301 back and forth. Discharging of the parasitic capacitor 308 to a (first) valley voltage 401 (followed by subsequent valleys 402 etc.) on voltage $V_D$ takes places during a delay time $T_q$. The delay time $T_q$ is one half of the period of the quasi-resonant and can be expressed as equation (1b):

$$T_q = \frac{1}{2 \cdot f_R}. \tag{1b}$$

If the switching device 304 is turned on during the valley voltage 401 across the switching device 308, switching loss and EMI can be decreased.

A switching control circuit 309 receives a feedback signal FB, a current sense signal $V_{CS}$ (e.g., a voltage representing the current) and a zero-crossing detection signal ZCD, and provides an output signal $V_{GD}$ (e.g., a voltage). The output signal $V_{GD}$ is to drive the switching device 304 such as a MOSFET. The switching device 304 is further coupled to the transformer 300 to generate a switching current signal on a current-sense resistor 310 that transforms a primary current $I_P$ flowing through primary winding 301 into the voltage $V_{CS}$ that forms current sense signal. The transformer 300 includes, besides primary winding 301 and secondary winding 302, an auxiliary winding 303 with an inductance $L_A$. The primary winding 301 is connected to the bulk voltage through switching device 302 and the secondary winding 302 provides the output voltage of the power converter through rectifier 305. The auxiliary winding 303 provides the zero-crossing detection signal ZCD to the switching control circuit 309 and may provide, through a rectifier arrangement 311, a supply voltage to the switching control circuit 309. An output voltage sense unit 312 is equipped (e.g., with an optical coupler and PI or PID regulator) to generate the galvanically isolated feedback signal FB. Thus, the input of the output voltage sense unit 312 is coupled to the output of the power converter and its output is coupled to the respective input of switching control circuit 309 to generate the switch control signal $V_{GD}$ for regulating the output voltage $V_{OUT}$ of the power converter.

As further shown in FIG. 3, the DC bulk voltage $V_{BULK}$ may be derived from an AC input voltage $V_{IN}$ by way of a bridge rectifier 313 and a smoothing capacitor 314. Input of switching control circuit 309 may include a control law unit such as a frequency law module 315 that generates from the feedback signal FB a peak current threshold $I_{PK}$ and a switching time signal representing the switching time period $T_{SW}$ or the switching time period thresholds TSWmin and TSWmax:

$$T_{SWmin} = \frac{1}{f_{SWmax}} \quad (2a)$$

$$T_{SWmin} = \frac{1}{f_{SWmax}} \quad (2b)$$

As can be seen from FIG. 4, the current sense signal $V_{CS}$, which is representative of the primary current $I_P$, increases during the time period $T_{ON}$ in which the switching element 304 is switched on until the peak current threshold $I_{PK}$ is reached and then switching element 304 is switched off until the next switch on. The time period between rising edges of successive on-time periods $T_{ON}$ is referred to as switching time period $T_{SW}$. Frequency law module 315 may include a look-up table or a calculation module to generate the peak current threshold $I_{PK}$ and switching time period $T_{SW}$ from feedback signal FB. Although not shown in FIG. 4, switching-on may be performed not only when a certain valley occurs but can alternatively be performed at other times as well, such as at zero crossing.

Figure 5:
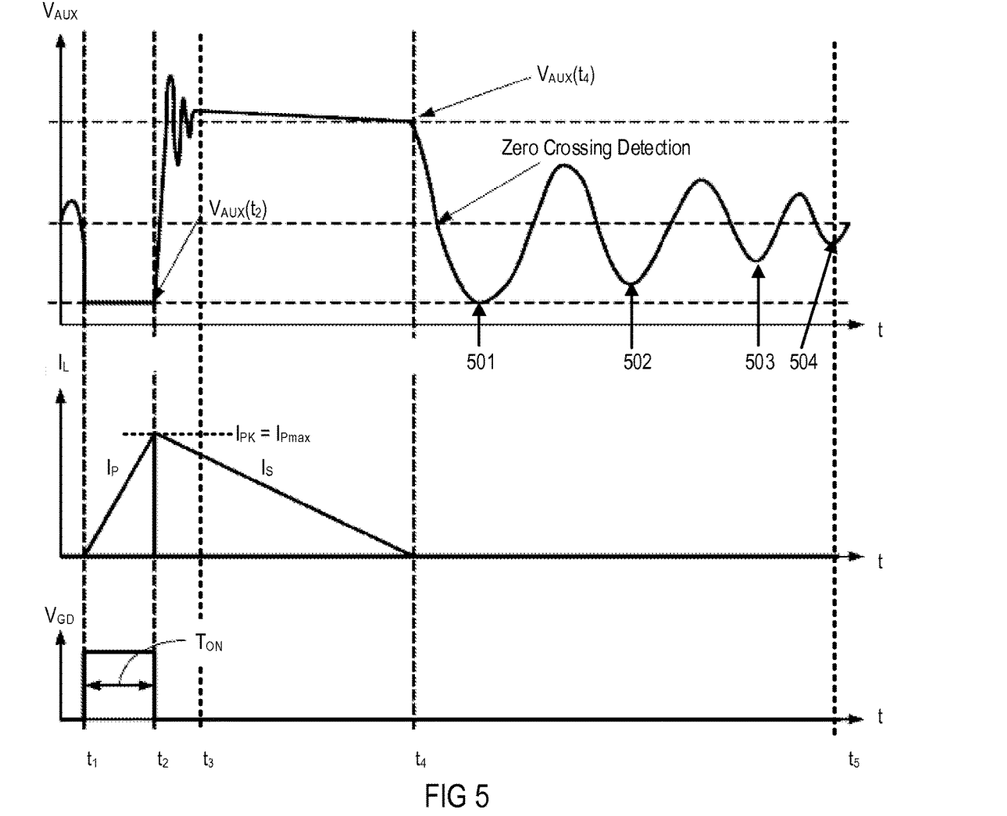
FIG. 5 is a diagram illustrating input and output signals of a transformer in the exemplary switched-mode power converter shown in FIG. 3.

FIG. 5 is a timing diagram showing the characteristics of a voltage $V_{AUX}$ across the auxiliary winding 303 in the power converter shown in FIG. 3 in connection with transformer current $I_L$ (i.e., primary current $I_P$ and secondary current $I_S$) and the output signal $V_{GD}$ of switch control unit 304. The signal curves between a time instant $t_1$ and a time instant $t_5$ when the switching element 304 is switched on again after it has been switched off at a time instant $t_2$, are continuously repeated during operation. At time instant $t_1$ switching element 304 is switched on and the primary current $I_P$ starts ramping up until a maximum current (peak current threshold $I_{PK}$) is reached at time instant $t_2$, when switching element 304 is switched off again. As a result, primary current $I_P$ quickly drops to zero, while a secondary current $I_S$ flowing through the secondary winding 302 steeply rises to its maximum value and then ramps down until it reaches zero at a time instant $t_4$. While switching element 304 is switched on between time instants $t_1$ and $t_2$ the voltage $V_{AUX}$ across the auxiliary winding 303 is almost zero. When switching element 304 is switched off at time instant $t_2$, the voltage $V_{AUX}$ steeply rises to a maximum voltage. Some ringing of the voltage $V_{AUX}$ may be observed between time instants $t_2$ and $t_3$ (i.e. during a settling time), and between time instants $t_3$ and $t_4$, when the secondary current $I_S$ has dropped to zero, the voltage $V_{AUX}$ drops to a value $V_{AUX}(t_4)$ that can be described with equation 3:

$$V_{AUX}(t_4) = V_{OUT} \cdot \frac{N_{AUX}}{N_{SEC}}, \quad (3)$$

in which $$V_{OUT} = L_S \cdot \frac{dI_S}{dt}, \quad (4)$$

$N_{AUX}$ is the number of turns of the auxiliary winding 303, $N_{SEC}$ is the number of turns of the secondary winding 302 and $L_S$ is the inductance of the secondary winding 302.

Accordingly, the drop of the voltage $V_{AUX}$ to a value $V_{AUX}(t_2)$ at time instant t2 can be described with equation 5:

$$V_{AUX}(t_2) = -V_{BULK} \cdot \frac{N_{AUX}}{N_{PRI}}, \quad (5)$$

in which $$V_{BULK} = L_P \cdot \frac{dI_P}{dt}, \quad (6)$$

$N_{PRI}$ is the number of turns of the primary winding 301, LP is the inductance of the primary winding 301 and the maximum primary current $I_{Pmax}$ is equal to the maximum transformer current $I_{LPK}$.

In the time interval between time instants $t_4$ and $t_5$, voltage $V_{AUX}$ rings again. When operating in a quasi-resonant mode, the switching element 304 is switched on again when the voltage $V_{AUX}$ reaches a certain one of a number of (local) minimums, valleys 501-504, which in the present example is at time instant $t_5$. At time instant $t_5$ the cycle starts over again. In the following, the time interval between $t_1$ and $t_2$ is referred to as the on-time $T_{ON}$, the time interval between $t_2$ and $t_4$ is referred to as off-time $T_{OFF}$ and the time interval between $t_4$ and $t_5$ is referred to as wait time $T_W$. On-time $T_{ON}$, off-time $T_{OFF}$ and wait time $T_W$ can be described with equations 7-9:

$$T_{ON} = L_P \cdot \frac{I_{LPK}}{V_{BULK}}, \quad (7)$$

$$T_{OFF} = L_P \cdot \frac{I_{LPK}}{V_R}, \quad (8)$$

$$T_W = \left(n - \frac{1}{2}\right) \cdot \frac{1}{f_R} \text{ with } n = 1, 2, 3... \quad (9)$$

in which $f_R$ is the resonant frequency in the quasi-resonant mode (see equation 1) and n is the number of the valley in a row starting with 1, and $$T_{SW} = T_{ON} + T_{OFF} + T_W = \frac{1}{f_{SW}}, \quad (10)$$

in which $f_{SW}$ is the switch frequency of switching element 304. The resulting primary power $P_P$ is according to equation 11:

$$P_P = \frac{1}{2} \cdot L_P \cdot I_{LPK}^2 \cdot f_{SW}. \quad (11)$$

The zero crossing signal ZCD may not only provide the zero crossings of the auxiliary voltage $V_{AUX}$ but also can form the basis for the calculation of the bulk voltage $V_{BULK}$ and the output voltage $V_{OUT}$. However, other ways to determine those parameters are applicable as well.

Figure 6:
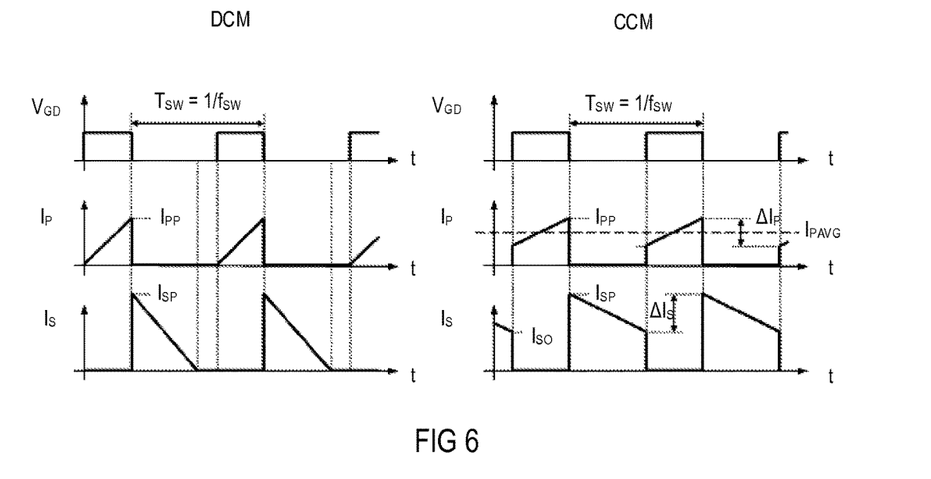
FIG. 6 is a diagram illustrating timing diagrams of the waveforms of the input (primary) current, the output (secondary) current, and the corresponding gate signal of the power semiconductor switch in DCM (a) and CCM (b)

Instead of the quasi-resonant mode illustrated in FIGS. 4 and 5, alternative modes of operation may be employed such as the two modes that are illustrated in the timing diagrams of FIG. 6. The diagrams in the left column refer to the discontinuous current mode (DCM) whereas the diagrams in the right column refer to the continuous current mode (CCM). Selection of a certain mode of operation may depend on the level of the bulk voltage $V_{BULK}$. In DCM and CCM the time instants $t_6$ and $t_{10}$, at which the semiconductor switch is switched on, and the time instants $t_7$ and $t_{11}$, at which the semiconductor switch is switched off, may be time-triggered or event-triggered. In a switching power converter that operates with a forced frequency, e.g., a fixed frequency, and variable on-time (i.e. a variable duty-cycle) these time instants are time-triggered. In a switching power converter that performs a quasi-resonant oscillation, the switch-on time as well as the switch-off time may be event-triggered. The "event", which triggers a switch-off of the semiconductor switch may be, for example, the primary current $I_P$ reaching a threshold value, whereas the event which triggers a switch-on of the semiconductor switch may be the voltage across the switching element being at a (local) minimum. For the further discussion, a flyback converter operated at a forced frequency, e.g., a fixed frequency $f_{SW}$ ($f_{SW}=T_{SW}^{-1}$), and having a variable duty cycle D (D=$T_{ON}/T_S$) is considered as an illustrative example.

The following considerations assume stationary operation in DCM, as illustrated in the diagrams in the left column of FIG. 6. A switching cycle starts at time instant $t_1$ and ends at time instant $t_9$ when the subsequent switching cycle begins. The period $T_S$ of one cycle can be calculated as:

$$T_{SW}=(t_{10}-t_6)=f_{SW}^{-1}. \quad (12)$$

The drive signal (e.g. the gate voltage $V_{GA}$), which controls the switching state of switching element 304, is switched on at time instant $t_6$ and switched off at time instant $t_7$. The on-time $T_{ON}$ can be calculated as $$T_{ON}=(t_7-t_6)=D \cdot T_{SW}=D \cdot (t_9-t_6), \quad (13)$$

wherein D denotes the duty cycle (D∈[0, 1]). The remaining time of one cycle is the off-time $T_{OFF}$, which can be calculated as $$T_{OFF}=(t_9-t_7)=(1-D) \cdot T_{SW}. \quad (14)$$

During the on-time $T_{ON}$ the primary current $I_P$ rises from zero to its peak value $I_{PP}$. The gradient of the current ramp is $V_{BULK}/L_P$ ($L_P$ representing the inductance of the primary winding) which is almost constant if the input voltage $V_{BULK}$ does not significantly change during one cycle. At time instant $t_2$ the energy $E_{DCM}$ stored in the primary winding can be calculated as $$E_{DCM}(t_7)=L_P \cdot I_{PP}^2/2. \quad (15)$$

As the switching element 304 is switched off at time instant $t_7$ the energy $E_{DCM}$ is "transferred" from the primary side to the secondary side of the transformer 300 due to inductive coupling. The secondary current $I_S$ is zero during the on-time $T_{ON}$ (as the rectifier diode 305 is reversed biased) and falls from its initial peak value $I_{SP}$, which occurs at time instant $t_7$, down to zero, which is reached at time instant $t_8$. The secondary current $I_S$ remains zero between time instants $t_8$ and $t_9$. It is noted that delay times (rise and fall times) are neglected in the present discussion in order focus attention on the basic function of the circuit. The secondary peak current $I_{SP}$ fulfils the equation $E_{DCM}(t_7)=L_S \cdot I_{SP}^2/2=L_P \cdot I_{Pp}^2/2$, wherein $L_S$ again represents the inductance of the secondary winding. The gradient of the secondary current ramp during the off-time $T_{OFF}$ is $(V_{OUT}+V_{305})/L_S$ wherein the $V_{305}$ is the forward voltage of the rectifier diode 305. In contrast to CCM, in DCM the secondary current $I_S$ drops (beginning at $I_{SP}$) to zero during a switching cycle whereas this is not the case during CCM—in the present example, time $t_7$.

Continuous current mode (CCM) is illustrated in the diagrams in the right column in FIG. 6. A switching cycle starts at time instant $t_5$ and ends at time instant $t_7$ when the subsequent switching cycle begins. In stationary operation, the initial primary current $I_{P0}$ ($I_{P0}=I_P(t_{10})$), which would be zero in DCM, is greater than zero in CCM as the energy $E_{CCM}$ "stored" in the transformer windings $L_P$ and $L_S$ never falls to zero during the off time $T_{OFF}$. At time instant $t_5$ the semiconductor switch $T_6$ is closed (drive signal $V_{GD}$ is at a high level) and the primary current $I_P$ starts to ramp up from the initial value $I_{P0}$ to the peak level $I_{PP}$, wherein $I_{PP}=I_{P0}+\Delta I_P$. When the primary current reaches its peak value $I_{PP}$ (defined by a current threshold) at time instant $t_{11}$ switching element 304 is switched off and the secondary current ramps down from its peak value $I_{SP}$ to its final value $I_{S0}$, wherein $I_{SP}=I_{S0}=\Delta I_S$. The energy "stored" in the transformer varies from $E_{CCMmin}=L_S \cdot I_{S0}^2/2=L_P \cdot I_{P0}^2/2$ to $E_{CCMmax}=L_S \cdot I_{SP}^2/2=L_P \cdot I_{PP}^2/2$. At the time instant $t_{12}$ the cycle starts over again, the secondary current $I_S$ is blocked by the rectifier diode 305, and the primary current "jumps" to its initial value $I_{P0}$ and ramps up as in the previous cycle.

Figure 7:
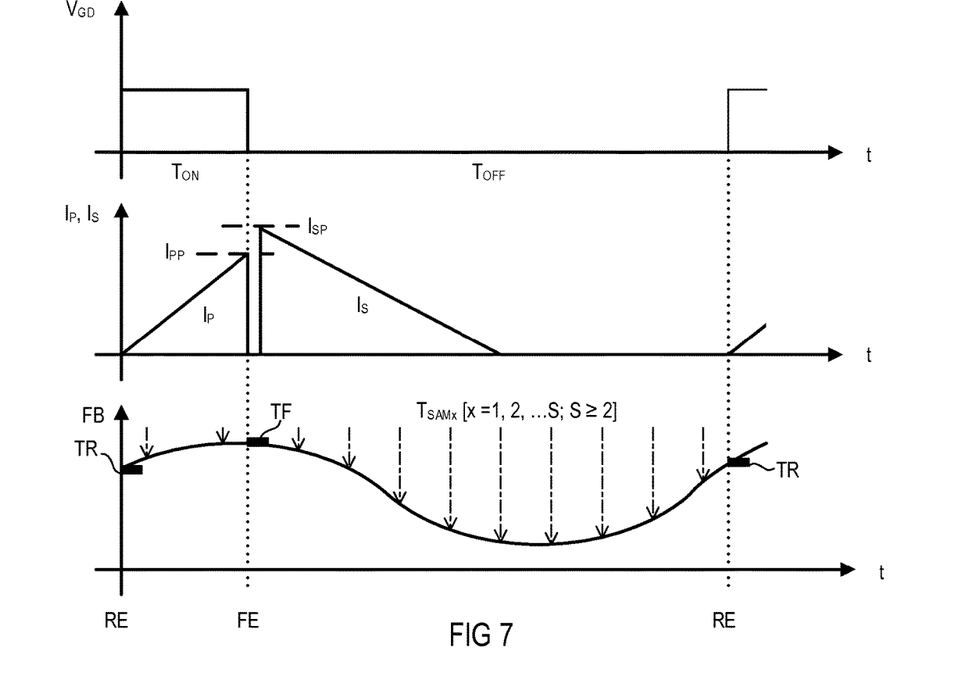
FIG. 7 is a diagram illustrating the sampling process of the feedback signal in the power converter shown in FIG. 3.
Figure 8:
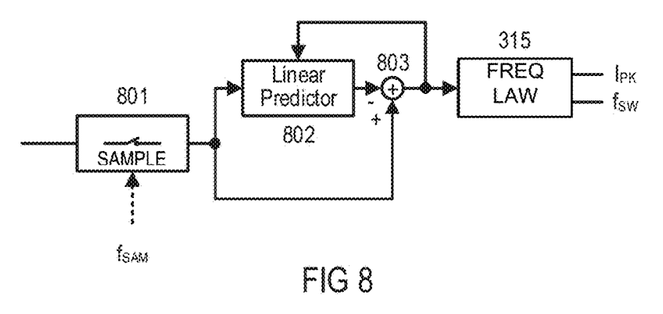
FIG. 8 is a circuit diagram of a sampling and filtering module using a linear predictor.
Figure 9:
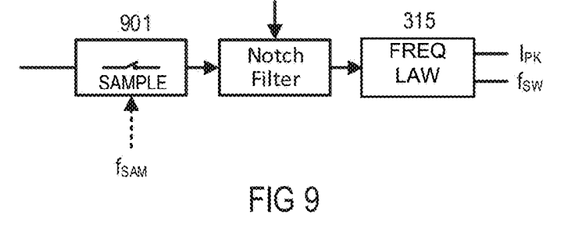
FIG. 9 is a circuit diagram of a sampling and filtering module using a notch filter.
Figure 10:
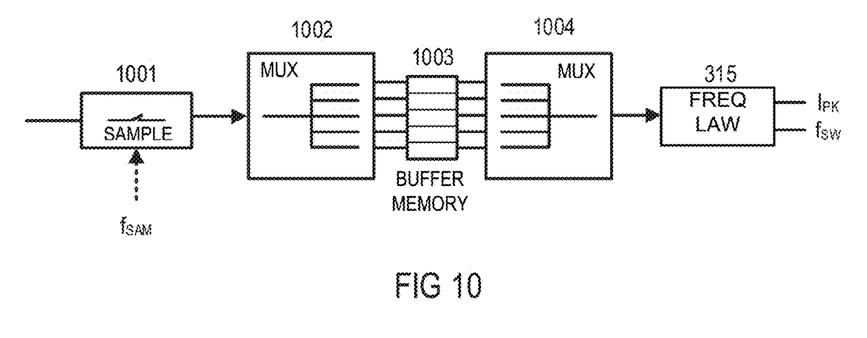
FIG. 10 is a circuit diagram of a sampling and filtering module which selects one or more suitable samples per switching cycle using inverse multiplexing, delaying and multiplexing.

Referring to FIG. 7, the power converter shown in FIG. 3 is, for example, operated in DCM, so that during on-time period $T_{ON}$ of switching element 304 the primary current ramps up to its peak value $I_{Pp}$ and where switching element 304 is switched off for the time period $T_{OFF}$ and secondary current $I_S$ ramps down to zero from peak value $I_{SP}$. One on-time period $T_{ON}$ and one off-time period $T_{OFF}$ form one drive cycle. In order to keep the output voltage (power) at a desired value, parameters such as the output voltage etc. are monitored by way of output voltage sense unit 312 which provides the feedback signal FB to the full or partly digital switching control circuit 309. Output voltage sense unit 312 may provide basic signal processing (e.g., PI or PID regulation) and galvanic isolation (e.g., by way of opto-electronic couplers etc.). In particular, PI or PID regulation may amplify noise, such as voltage ripples, that may interfere with the output voltage $V_{OUT}$ so that the feedback signal FB may contain a relatively high amount of noise. In FIG. 7, the feedback signal FB is assumed to be almost constant but superimposed by noise in the form of sinusoidal ripples. When sampling only one time during period $T_{OFF}$, the noise may lead to an incorrect assessment of the output voltage $V_{OUT}$, as only this particular sample, which may include a considerable amount of noise, serves as a basis for the subsequent control of switching element 304. However, sampling the feedback signal FB two or more times (i.e., at s times $T_{SAMx}$, x=1, 2, . . . s, s≥2) during the on-periods and/or off-periods of the drive cycles gives a much clearer picture of the feedback signal FB, including a signal representative of an operation parameter (e.g., output voltage $V_{OUT}$) of the switched-mode power converter and noise. Although more samples are more precise, noise (e.g., voltage ripples) is still present in the feedback signal FB. In order to eliminate the noise, filters, e.g., dedicated digital filters as shown in FIGS. 8-10, may be employed. The power converter may produce additional noise in the rising and falling edges RE, FE of the on-periods of switching element 304. To avoid that, switching noise is sampled. Sampling may be blocked for a certain time period TR shortly before or after the rising edges RE occur and a certain time-period TF shortly before or after the falling edges FE occur.

As can be seen from FIG. 7, higher sampling rates may be employed during turn-off periods than during turn-on phases in a "normal operation mode", i.e., in CCM, DCM or QRn mode. During normal operation mode dedicated sampling is synchronized to the switching frequency to determine the next pulse width modulation (PWM) cycle. This may be performed either at the very beginning of the turn-on phase, to consider the sampled value for the already ongoing turn-on phase, or at the end of the turn-off phase in view of the next PWM cycle. The other samples taken during the turn-off phase can be used for a dv/dt detection on the feedback signal in order to indentify in advance a load jump at the output. Based on this there can be, e.g., an immediate change to the lowest QR-n mode or a positive offset can support the compensation network in reacting to the load jump.

In burst mode operation, the sampling rate may be increased compared to normal mode and all or at least the majority of sampled values may be evaluated (e.g., for load detection), as it is desired to immediately detect whether the feedback signal has exceeded a burst mode exit threshold in order to exit the burst mode at once. In burst mode, there is no correlation between sampled feedback values and defining the PWM cycle. The feedback signal and, thus, the samples are only used for two-point regulation in which the feedback signal toggles between two thresholds.

FIG. 8 shows a sampling module 801, which receives the feedback signal FB and which samples with a sample frequency $f_{SAM}$, and a linear predictor module 802, which comes after the sampling module 801. The output signal of linear predictor module 802, which is a signal representing the predicted noise, is subtracted from the output signal of sampling module by a subtractor 803 whose output signal is supplied to a PWM modulator. The PWM modulator may include the frequency law unit 315 shown in FIG. 3. Linear prediction is a mathematical operation with which future values of a discrete-time signal are estimated as a linear function of previous samples. It is often used in linear predictive coding (LPC) and can be viewed as a subset of filter theory.

FIG. 9 shows a sampling module 901, which receives the feedback signal FB and which samples with the sample frequency $f_{SAM}$, and a notch filter module 902, which comes after the sampling module 901. The output signal of sampling module 901 is supplied to the PWM modulator, which may include the frequency law unit 315 shown in FIG. 3. The pass frequency of notch filter module 902 may be controlled with a control signal CF to let only wanted signals pass and to keep unwanted noise signals from passing.

FIG. 10 shows a sampling module 1001, which receives the feedback signal FB, and a notch filter module 902, which comes after sampling module 901.

FIG. 10 shows a sampling module 1001, which receives the feedback signal FB and which samples with the sample frequency $f_{SAM}$, and an inverse multiplexer module 1002, which comes after the sampling module 1001 and which provides a multiplicity of output signals. The output signals may be stored in a buffer memory module 1003. One or more of the available output signals are selected for the PWM modulation by a selection unit 1004. The PWM modulator may include the frequency law unit 315 shown in FIG. 3. Selection criteria can be that the latest available sample prior to the PWM modulation update has been taken or that those samples where the least distortion from switching is expected have been taken.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

In one or more examples, the functions described herein may be implemented at least partially in hardware, such as specific hardware components or a processor. More generally, the techniques may be implemented in hardware, processors, software, firmware, or any combination thereof. If implemented in software, the functions, as one or more instructions or code, may be stored on or transmitted via a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media may generally include (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, but without limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium, i.e., a computer-readable transmission medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structures or any other structure suitable for implementation of the techniques described herein. In addition, in some aspects the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a single hardware unit or provided by a collection of intraoperative hardware units, including one or more processors as described above, in conjunction with suitable software and/or firmware.

What is claimed is:

1. A method configured to operate a switched-mode power converter, in which the power converter is operable to convert an input voltage into an output voltage at a switching frequency of a switching element in the power converter; the method comprising:
   driving the switching element in successive drive cycles, in which the switching element is driven to switch on for an on-period and subsequently driven to switch off for an off-period;
   sampling a feedback signal two or more times during the drive cycles; the feedback signal comprising a signal representative of an operation parameter of the switched-mode power converter and noise, wherein a sampling rate of the sampling during off-periods is higher than the sampling rate during on-periods;
   filtering the sampled feedback signal to extract the signal representative of the operation parameter of the switched-mode power converter from the sampled feedback signal;
   controlling the switching element according to the filtered sampled feedback signal; and
   during the filtering,
      generating output signals,
      temporarily storing the output signals, and
      selecting at least one of the temporarily stored output signals, according to selection criteria, as the signal representative of the operation parameter of the switched-mode power converter.

2. The method of claim 1, wherein the operation parameter of the switched-mode power converter is the output voltage of the power converter.

3. The method of claim 1, further comprising
   detecting rising and fallen edges of the on-period; and
   blocking sampling for or excluding samples taken within a first time period shortly before or after rising edges and a second time period shortly before or after falling edges.

4. The method of claim 1, wherein the power converter is operated in a discontinuous mode, continuous mode, quasi-resonant mode or burst mode.

5. The method of claim 4, wherein in burst mode a sampling rate of the sampling is higher than in discontinuous mode, continuous mode or quasi-resonant mode.

6. The method of claim 1, wherein the selection criteria is such that samples having the least distortion from a switching of the switching elements are selected.

7. The method of claim 1, wherein the selection criteria is such that a final sample preceding a new drive cycle is selected.

8. A switched-mode power converter, which is operable to convert an input voltage into an output voltage at a switching frequency of a switching element in the power converter, comprising:
   a control unit configured to drive the switching element in successive drive cycles, in which the switching element is driven to switch on for an on-period and subsequently driven to switch off for an off-period; wherein the control unit is further configured to:
      sample a feedback signal two or more times during the drive cycles; the feedback signal comprising a signal representative of an operation parameter of the switched-mode power converter and noise, wherein a sampling rate of the sampling during off-periods is higher than the sampling rate during on-periods;
      filter the sampled feedback signal to extract the signal representative of the operation parameter from the sampled feedback signal;
      control the switching element according to the filtered feedback signal; and
      during the filtering,
         generate output signals,
         temporarily store the output signals, and
         select at least one of the temporarily stored output signals, according to selection criteria, as the signal representative of the operation parameter of the switched-mode power converter.

9. The power converter of claim 8, wherein the selection criteria is such that samples having the least distortion from a switching of the switching elements are selected.

10. The power converter of claim 8, wherein the selection criteria is such that a final sample preceding a new drive cycle is selected.

11. The power converter of claim 8, wherein the operation parameter of the switched-mode power converter is the output voltage of the power converter.

12. The power converter of claim 8, wherein the control unit is further configured to:
   detect rising and fallen edges of the on-period and
   block sampling for or exclude samples taken within a first time period shortly before or after rising edges and a second time period after or around falling edges.

13. The power converter of claim 8, wherein the power converter is configured to operate in at least one of discontinuous mode, continuous mode, quasi-resonant mode, and burst mode.

14. The power converter of claim 13, wherein in burst mode the sampling rate is higher than in discontinuous mode, continuous mode or quasi-resonant mode.

15. A computer-readable storage device storing computer-executable instructions that, in response to execution, cause a processing component to:
- drive a switching element of a switched-mode power converter in successive drive cycles, in which the switching element is driven to switch on for an on-period and subsequently driven to switch off for an off-period;
- sample a feedback signal two or more times during the drive cycles, the feedback signal comprising a signal representative of an operation parameter of the switched-mode power converter and noise, wherein a sampling rate of the sampling during off-periods is higher than the sampling rate during on-periods;
- filter the sampled feedback signal to extract the signal representative of the operation parameter from the sampled feedback signal;
- control the switching element according to the filtered sampled feedback signal; and
- during the filtering,
    - generate output signals,
    - temporarily store the output signals, and
    - select at least one of the temporarily stored output signals, according to selection criteria, as the signal representative of the operation parameter of the switched-mode power converter.

16. The computer-readable storage device of claim 15, wherein the power converter is operated in a discontinuous mode, continuous mode, quasi-resonant mode or burst mode.

17. The computer-readable storage device of claim 16, wherein in burst mode a sampling rate of the sampling is higher than in discontinuous mode, continuous mode or quasi-resonant mode.

18. The computer-readable storage device of claim 15, wherein the selection criteria is such that a final sample preceding a new drive cycle is selected.

19. The computer-readable storage device of claim 15, wherein the selection criteria is such that samples having the least distortion from a switching of the switching elements are selected.

20. The computer-readable storage device of claim 15, wherein the operation parameter of the switched-mode power converter is an output voltage of the power converter.

21. The computer-readable storage device of claim 15, further comprising
- detecting rising and fallen edges of the on-period and
- blocking sampling for or excluding samples taken within a first time period shortly before or after rising edges and a second time period shortly before or after falling edges.

* * * * *